US007062498B2

(12) United States Patent
Al-Kofahi et al.

(10) Patent No.: US 7,062,498 B2
(45) Date of Patent: Jun. 13, 2006

(54) SYSTEMS, METHODS, AND SOFTWARE FOR CLASSIFYING TEXT FROM JUDICIAL OPINIONS AND OTHER DOCUMENTS

(75) Inventors: Khalid Al-Kofahi, Webster, NY (US); Peter Jackson, Burnsville, MN (US); Timothy Earl Travers, Rochester, NY (US); Alex Tyrell, Canandaigua, NY (US)

(73) Assignee: Thomson Legal Regulatory Global AG, Thalwel (CH)

( * ) Notice: Subject to any disclaimer, the term of this patent is extended or adjusted under 35 U.S.C. 154(b) by 401 days.

(21) Appl. No.: 10/027,914

(22) Filed: Dec. 21, 2001

(65) Prior Publication Data

US 2003/0101181 A1 May 29, 2003

Related U.S. Application Data

(60) Provisional application No. 60/336,862, filed on Nov. 2, 2001.

(51) Int. Cl.
*G06F 17/00* (2006.01)

(52) U.S. Cl. .................................... 707/101; 715/530
(58) Field of Classification Search .................. 707/100, 707/101; 715/530, 531
See application file for complete search history.

(56) References Cited

U.S. PATENT DOCUMENTS

| 4,961,152 | A | * | 10/1990 | Davis | 706/13 |
|---|---|---|---|---|---|
| 5,054,093 | A | * | 10/1991 | Cooper et al. | 382/159 |
| 5,157,783 | A | | 10/1992 | Anderson et al. | 395/600 |
| 5,265,065 | A | | 11/1993 | Turtle | 395/600 |
| 5,383,120 | A | * | 1/1995 | Zernik | 704/10 |
| 5,418,948 | A | | 5/1995 | Turtle | 395/600 |
| 5,434,932 | A | | 7/1995 | Scott | 382/309 |
| 5,438,629 | A | * | 8/1995 | Moed et al. | 382/156 |
| 5,488,725 | A | | 1/1996 | Turtle et al. | 395/600 |
| 5,497,317 | A | | 3/1996 | Hawkins et al. | 364/408 |
| 5,644,720 | A | | 7/1997 | Boll et al. | 395/200.12 |
| 5,761,383 | A | * | 6/1998 | Engel et al. | 706/14 |
| 5,778,397 | A | * | 7/1998 | Kupiec et al. | 715/500 |
| 5,918,240 | A | * | 6/1999 | Kupiec et al. | 715/531 |
| 5,991,755 | A | | 11/1999 | Noguchi et al. | 707/3 |

(Continued)

FOREIGN PATENT DOCUMENTS

WO     WO-00/67162     11/2000

OTHER PUBLICATIONS

Conrad et al, "A Cognitive Approach to Judicial Opinion Structure: Applying Domain Expertise to Component Analysis", ACM, May 2001, pp. 1–11.*

(Continued)

*Primary Examiner*—Uyen Le
(74) *Attorney, Agent, or Firm*—Schwegman, Lunberg, Woessner & Kluth, P.A.

(57) ABSTRACT

To reduce cost and improve accuracy, the inventors devised systems, methods, and software to aid classification of text, such as headnotes and other documents, to target classes in a target classification system. For example, one system computes composite scores based on: similarity of input text to text assigned to each of the target classes; similarity of non-target classes assigned to the input text and target classes; probability of a target class given a set of one or more non-target classes assigned to the input text; and/or probability of the input text given text assigned to the target classes. The exemplary system then evaluates the composite scores using class-specific decision criteria, such as thresholds, ultimately assigning or recommending assignment of the input text to one or more of the target classes. The exemplary system is particularly suitable for classification systems having thousands of classes.

17 Claims, 6 Drawing Sheets

U.S. PATENT DOCUMENTS

| | | | | | |
|---|---|---|---|---|---|
| 6,038,527 | A | * | 3/2000 | Renz | 704/9 |
| 6,052,657 | A | | 4/2000 | Yamron et al. | 704/9 |
| 6,502,081 | B1 | * | 12/2002 | Wiltshire et al. | 706/12 |
| 6,507,843 | B1 | * | 1/2003 | Dong et al. | 707/6 |
| 6,539,352 | B1 | * | 3/2003 | Sharma et al. | 704/249 |
| 6,651,058 | B1 | * | 11/2003 | Sundaresan et al. | 707/6 |
| 6,751,600 | B1 | * | 6/2004 | Wolin | 706/12 |
| 6,760,701 | B1 | * | 7/2004 | Sharma et al. | 704/249 |
| 2002/0099730 | A1 | * | 7/2002 | Brown et al. | 707/500 |
| 2003/0004716 | A1 | * | 1/2003 | Haigh et al. | 704/238 |
| 2004/0039786 | A1 | * | 2/2004 | Horvitz et al. | 709/207 |

OTHER PUBLICATIONS

Jackson et al, "Information Extraction from Case Law and Retrieval of Prior Cases by Partial Parsing and Query Generation", ACM, Sep. 1998, pp. 60–67.*

Brüninghaus et al, "Improving the Representation of Legal Case Texts with Information Extraction Methods", ACM, May 2001, pp. 42–51.*

Al–Kofahi, K., et al., "Combining Multiple Classifiers for Text Categorization", *Proceedings of CIKM '01: Tenth International Conference on Information and Knowledge Management*, Atlanta, GA, (Nov. 5–10, 2001), 97–104.

Iyer, R. D., et al., "Boosting for Document Routing", *Proceedings of the Ninth International Conference on Information and Knowledge Managment—CIKM 2000*, McLean, Va, (Nov. 6, 2000), 70–77.

Kittler, J., et al., "On Combining Classifiers", *IEEE Transactions on Pattern Analysis and Machine Intelligence*, 20, (Mar., 1998), 226–239.

Lam, L., "Classifier Combinations: Implementations and Theoretical Issues", *Proceedings of the First International Workshop on Multiple Classifier Systems—MCS 2000 (Lecture Notes in Computer Science, vol. 1857)*, Cagliari, Italy, (Jun. 21, 2000), 77–86.

Larkey, L.S. and W. B. Croft, "Combining Classifiers in Text Categorization", *Proceedings, 19th Annual International ACM SIGIR Conference on Research and Development in Information Retrieval*, Zurich, Switzerland, (1996), 289–297.

Ragas, H., et al., "Four Text Classification Algorithms Compared on a Dutch Corpus", *Proceedings of the First International Workshop on Multiple Classifier Systems—MCS 2000 (Lecture Notes in Computer Science, vol. 1857)*, Cagliari, Italy, (Jun. 21–23, 2000), 369–370.

Tumer, K., et al., "Order Statistics Combiners for Neural Classifiers", *Proceedings of the World Congress on Neural Networks, WCNN '95, World Congress on Neural Networks, 1995 International Neural Network Society Annual Meeting*, Washington, D.C., (Jul. 17, 1995), 31–34.

Yang, Y., et al., "A Re–Examination of Text Categorization Methods", *Proceedings of SIGIR '99, 22nd International Conference on Research and Development in Information Retrieval*, New York, NY, (Aug., 1999), 42–49.

Danowski, J. A., "Wordij: A Word–Pair Approach to Information Retrieval", *NIST Special Publication*, Gaithersburg, MD, US,(Mar. 1, 1993), pp. 131–136.

Hatzivassiloglou, V., et al., "An Investigation of Linguistic Features and Clustering Algorithms for Topical Document Clustering", *23rd Annual International ACM SIGIR Conference on Research and Development in Information Technology*, 34, SIGIR 2000: Athens, Greece,(Jul. 24, 2000), pp. 224–321.

Papka, R. et al., "Document Classification Using Multiword Features", *Proceedings of the 1998 ACM CIKM 7th International Conf. on Info. and Knowledge Mgt.*, Bethesda, MD, USA, (Nov. 3, 1998), pp. 124–131.

* cited by examiner

SYSTEMS, METHODS, AND SOFTWARE FOR CLASSIFYING TEXT FROM JUDICIAL OPINIONS AND OTHER DOCUMENTS

RELATED APPLICATION

This application is a continuation of U.S. Provisional Application 60/336,862, which was filed on Nov. 2, 2001 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright ©2001, West Group.

TECHNICAL FIELD

The present invention concerns systems, methods, and software for classifying text and documents, such as headnotes of judicial opinions.

BACKGROUND

The American legal system, as well as some other legal systems around the world, relies heavily on written judicial opinions - - - the written pronouncements of judges - - - to articulate or interpret the laws governing resolution of disputes. Each judicial opinion is not only important to resolving a particular legal dispute, but also to resolving similar disputes in the future. Because of this, judges and lawyers within our legal system are continually researching an ever-expanding body of past opinions, or case law, for the ones most relevant to resolution of new disputes.

To facilitate these searches, companies, such as West Publishing Company of St. Paul, Minn. (doing business as West Group), not only collect and publish the judicial opinions of courts across the United States, but also summarize and classify the opinions based on the principles or points of law they contain. West Group, for example, creates and classifies headnotes - - - short summaries of points made in judicial opinions - - - using its proprietary West Key Number™ System. (West Key Number is a trademark of West Group.)

The West Key Number System is a hierarchical classification of over 20 million headnotes across more than 90,000 distinctive legal categories, or classes. Each class has not only a descriptive name, but also a unique alpha-numeric code, known as its Key Number classification.

In addition to highly-detailed classification systems, such as the West Key Number System, judges and lawyers conduct research using products, such as American Law Reports (ALR), that provide in-depth scholarly analysis of a broad spectrum of legal issues. In fact, the ALR includes about 14,000 distinct articles, known as annotations, each teaching about a separate legal issue, such as double jeopardy and free speech. Each annotations also include citations and/or headnotes identifying relevant judicial opinions to facilitate further legal research.

To ensure their currency as legal-research tools, the ALR annotations are continually updated to cite recent judicial opinions (or cases). However, updating is a costly task given that courts across the country collectively issue hundreds of new opinions every day and that the conventional technique for identifying which of these cases are good candidates for citation is inefficient and inaccurate.

In particular, the conventional technique entails selecting cases that have headnotes in certain classes of the West Key Number System as candidates for citations in corresponding annotations. The candidate cases are then sent to professional editors for manual review and final determination of which should be cited to the corresponding annotations. Unfortunately, this simplistic mapping of classes to annotations not only sends many irrelevant cases to the editors, but also fails to send many that are relevant, both increasing the workload of the editors and limiting accuracy of the updated annotations.

Accordingly, there is a need for tools that facilitate classification or assignment of judicial opinions to ALR annotations and other legal research tools.

SUMMARY OF EXEMPLARY EMBODIMENTS

To address this and other needs, the present inventors devised systems, methods, and software that facilitate classification of text or documents according to a target classification system. For instance, one exemplary system aids in classifying headnotes to the ALR annotations; another aids in classifying headnotes to sections of American Jurisprudence (another encyclopedic style legal reference); and yet another aids in classifying headnotes to the West Key Number System. However, these and other embodiments are applicable to classification of other types of documents, such as emails.

More particularly, some of the exemplary systems classify or aid manual classification of an input text by determining a set of composite scores, with each composite score corresponding to a respective target class in the target classification system. Determining each composite score entails computing and and applying class-specific weights to at least two of the following types of scores:

a first type based on similarity of the input text to text associated with a respective one of the target classes;

a second type based on similarity of a set of non-target classes associated with the input text and a set of non-target classes associated with a respective one of the target classes;

a third type based on probability of one of the target classes given a set of one or more non-target classes associated with the input text; and a fourth type based on a probability of the input text given text associated with a respective one of the target classes.

These exemplary systems then evaluate the composite scores using class-specific decision criteria, such as thresholds, to ultimately assign or recommend assignment of the input text (or a document or other data structure associated with the input text) to one or more of the target classes.

DETAILED DESCRIPTION OF EXEMPLARY EMBODIMENTS

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following exemplary definitions are presented.

The term "document" refers to any addressable collection or arrangement of machine-readable data.

The term "database" includes any logical collection or arrangement of documents.

The term "headnote" refers to an electronic textual summary or abstract concerning a point of law within a written judicial opinion. The number of headnotes associated with a judicial opinion (or case) depends on the number of issues it addresses.

Exemplary System for Classifying Headnotes to American Legal Reports

Figure 1:
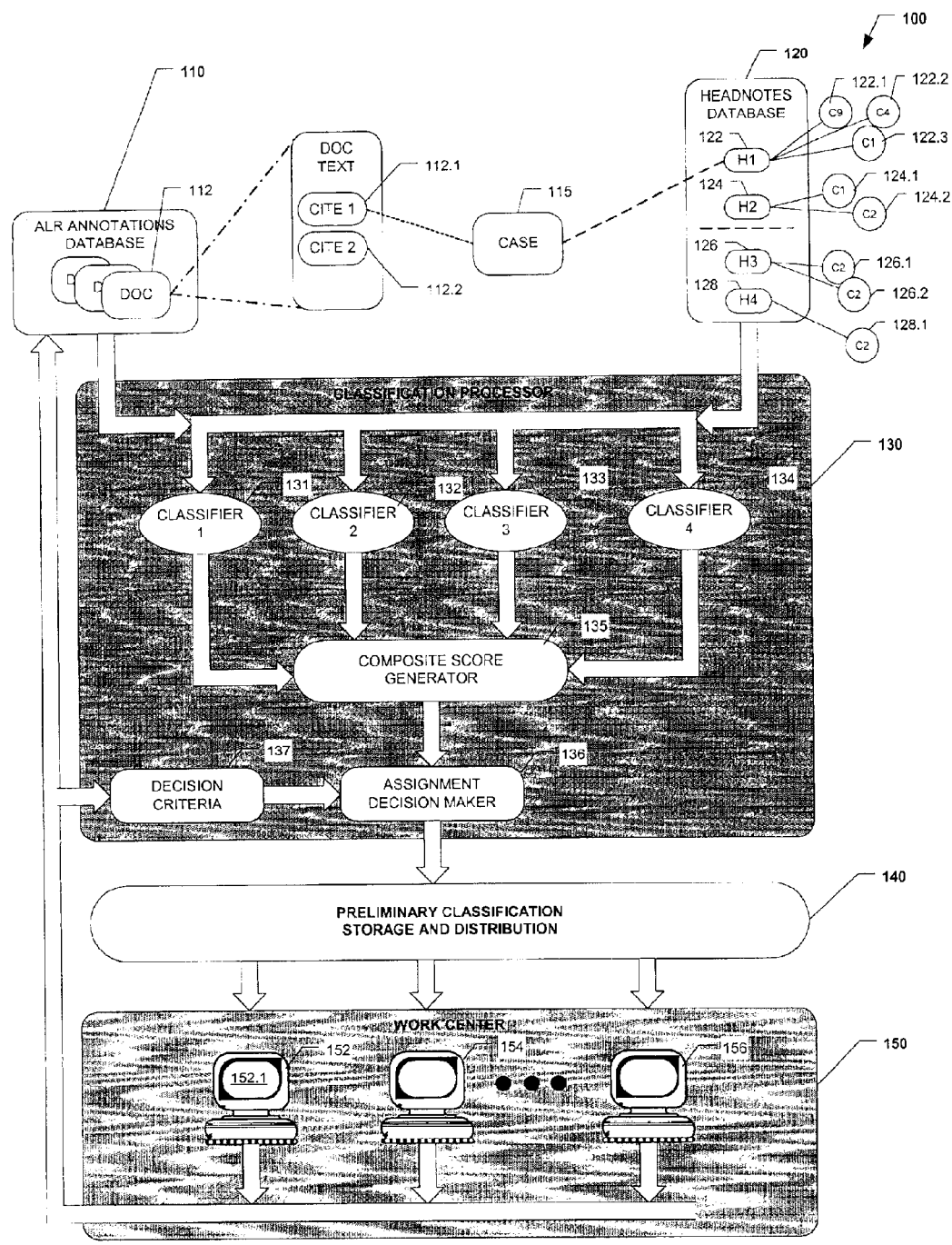
FIG. 1 is a diagram of an exemplary classification system 100 embodying teachings of the invention, including a unique graphical user interface 114.

FIG. 1 shows a diagram of an exemplary document classification system 100 for automatically classifying or recommending classifications of electronic documents according to a document classification scheme. The exemplary embodiment classifies or recommends classification of cases, case citations, or associated headnotes, to one or more of the categories represented by 13,779 ALR annotations. (The total number of annotation is growing at a rate on the order of 20–30 annotations per month.) However, the present invention is not limited to any particular type of documents or type of classification system.

Though the exemplary embodiment is presented as an interconnected ensemble of separate components, some other embodiments implement their functionality using a greater or lesser number of components. Moreover, some embodiments intercouple one or more the components through a local- or wide-area network. (Some embodiments implement one or more portions of system 100 using one or more mainframe computers or servers.) Thus, the present invention is not limited to any particular functional partition.

System 100 includes an ALR annotation database 110, a headnotes database 120, and a classification processor 130, a preliminary classification database 140, and editorial workstations 150.

ALR annotation database 110 (more generally a database of electronic documents classified according to a target classification scheme) includes a set of 13,779 annotations, which are presented generally by annotation 112. The exemplary embodiment regards each annotation as a class or category. Each annotation, such as annotation 112, includes a set of one or more case citations, such as citations 112.1 and 112.2.

Each citation identifies or is associated with at least one judicial opinion (or generally an electronic document), such as electronic judicial opinion (or case) 115. Judicial opinion 115 includes and/or is associated with one or more headnotes in headnote database 120, such as headnotes 122 and 124. (In the exemplary embodiment, a typical judicial opinion or case has about 6 associated headnotes, although cases having 50 or more are not rare.)

A sample headnote and its assigned West Key Number class identifier are shown below. Exemplary Headnote In an action brought under Administrative Procedure Act (APA), inquiry is twofold: court first examines the organic statute to determine whether Congress intended that an aggrieved party follow a particular administrative route before judicial relief would become available; if that generative statute is silent, court then asks whether an agency's regulations require recourse to a superior agency authority Exemplary Key Number class identifier 15AK229 —ADMINISTRATIVE LAW AND PROCEDURE —SEPARATION OF ADMINISTRATIVE AND OTHER POWERS —JUDICIAL POWERS In database 120, each headnote is associated with one or more class identifiers, which are based, for example, on the West Key Number Classification System. (For further details on the West Key Number System, see West's Analysis of American Law: Guide to the American Digest System, 2000 Edition, West Group, 1999, which is incorporated herein by reference.) For example, headnote 122 is associated with classes or class identifiers 122.1, 122.2, and 122.3, and headnote 124 is associated with classes or class identifiers 124.1 and 124.2.

In the exemplary system, headnote database 120 includes about 20 million headnotes and grows at an approximate rate of 12,000 headnotes per week. About 89% of the headnotes are associated with a single class identifier, about 10% with two class identifiers, and about 1% with more than two class identifiers.

Additionally, headnote database 120 includes a number of headnotes, such as headnotes 126 and 128, that are not yet assigned or associated with an ALR annotation in database 110. The headnotes, however, are associated with class identifiers. Specifically, headnote 126 is associated with class identifiers 126.1 and 126.2, and headnote 128 is associated with class identifier 128.1.

Coupled to both ALR annotation database 110 and headnote database 120 is classification processor 130. Classification processor 130 includes classifiers 131, 132, 133, and 134, a composite-score generator 135, an assignment decision-maker 136, and decision-criteria module 137. Processor 130 determines whether one or more cases associated with headnotes in headnote database 120 should be assigned to or cited within one or more of the annotations of annotation database 110. Processor 130 is also coupled to preliminary classification database 140.

Preliminary classification database 140 stores and/or organizes the assignment or citation recommendations. Within database 140, the recommendations can be organized as a single first-in-first-out (FIFO) queue, as multiple FIFO queues based on single annotations or subsets of annotations. The recommendations are ultimately distributed to work center 150.

Work center 150 communicates with preliminary classification database 140 as well as annotation database 110 and ultimately assists users in manually updating the ALR annotations in database 110 based on the recommendations stored in database 140. Specifically, work center 150 includes workstations 152, 154, and 156. Workstation 152, which is substantially identical to workstations 154 and 156, includes a graphical-user interface 152.1, and user-interface devices, such as a keyboard and mouse (not shown.)

In general, exemplary system 100 operates as follows. Headnotes database 120 receives a new set of headnotes (such as headnotes 126 and 128) for recently decided cases, and classification processor 130 determines whether one or more of the cases associated with the headnotes are sufficiently relevant to any of the annotations within ALR to justify recommending assignments of the headnotes (or associated cases) to one or more of the annotations. (Some other embodiments directly assign the headnotes or associated cases to the annotations.) The assignment recommendations are stored in preliminary classification database 140 and later retrieved by or presented to editors in work center 150 via graphical-user interfaces in workstations 152, 154, and 156 for acceptance or rejection. Accepted recommendations are added as citations to the respective annotations in ALR annotation database 110 and rejected recommendations are not. However, both accepted and rejected recommendations are fed back to classification processor 130 for incremental training or tuning of its decision criteria.

Figure 2:
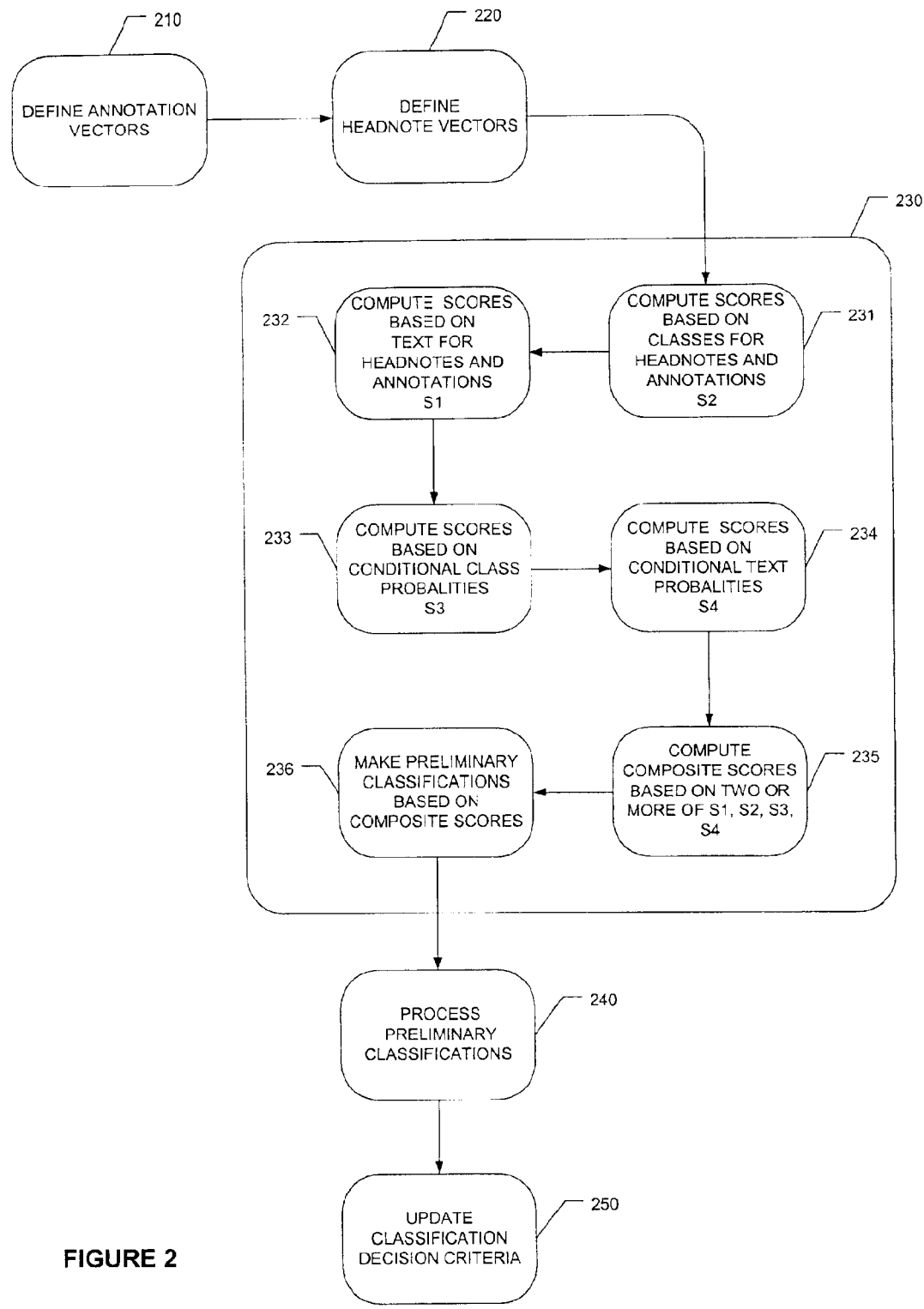
FIG. 2 is a flowchart illustrating an exemplary method embodied in classification system 100 of FIG. 1.

More particularly, FIG. 2 shows a flow chart 200 illustrating in greater detail an exemplary method of operating system 100. Flow chart 200 includes a number of process blocks 210–250. Though arranged serially in the exemplary embodiment, other embodiments may reorder the blocks, omits one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, the exemplary process flow is applicable to software, firmware, hardware, and hybrid implementations.

The remainder of the description uses the following notational system. The lower case letters a, h, and k respectively denote an annotation, a headnote, and a class or class identifier, such as a West Key Number class or class identifier. The upper case letters A, H, and K respectively denote the set of all annotations, the set of all headnotes, and the set of all key numbers classifications. Additionally, variables denoting vector quantities are in bold-faced capital letters, and elements of the corresponding vectors are denoted in lower case letters. For example, V denotes a vector, and v denotes an element of vector V.

At block 210, the exemplary method begins by representing the annotations in annotations database 110 (in FIG. 1) as text-based feature vectors. In particular, this entails representing each annotation a as a one-column feature vector, $V_a$, based on the noun and/or noun-word pairs occurring in headnotes for the cases cited within the annotation. (Other embodiments represent the headnotes as bigrams or noun phrases.)

Although it is possible to use all the headnotes associated with the cases cited in the annotation, the exemplary embodiment selects from the set of all headnotes associated with the cited cases those that are most relevant to the annotation being represented. For each annotation, this entails building a feature vector using all the headnotes in all cases cited in the annotation and selecting from each case one, two, or three headnotes based on similarity between the headnotes in a cited case and those of the citing annotation and denoting the most similar headnote(s) as relevant. To determine the most relevant headnotes, the exemplary embodiment uses classifiers 131–134 to compute similarity scores, averages the four scores for each headnote, and defines as most relevant the highest scoring headnote plus those with a score of at least 80% of the highest score. The 80% value was chosen empirically.

Once selected, the associated headnotes (or alternatively the actual text of the annotations) are represented as a set of nouns, noun-noun, noun-verb, and noun-adjective pairs that it contains. Words in a word-pair are not necessarily adjacent, but are within a specific number of words or characters of each other, that is, within a particular word or character window. The window size is adjustable and can take values from 1 to the total number of words or characters in the headnote. Although larger windows tend to yield better performance, in the exemplary embodiment, no change in performance was observed for windows larger than 32 non-stop words. For convenience, however, the exemplary window size is set to the actual headnote size. The exemplary embodiment excludes stop words and uses the root form of all words. Appendix A shows an exemplary list of exemplary stopwords; however, other embodiments use other lists of stopwords.

Figure 3:
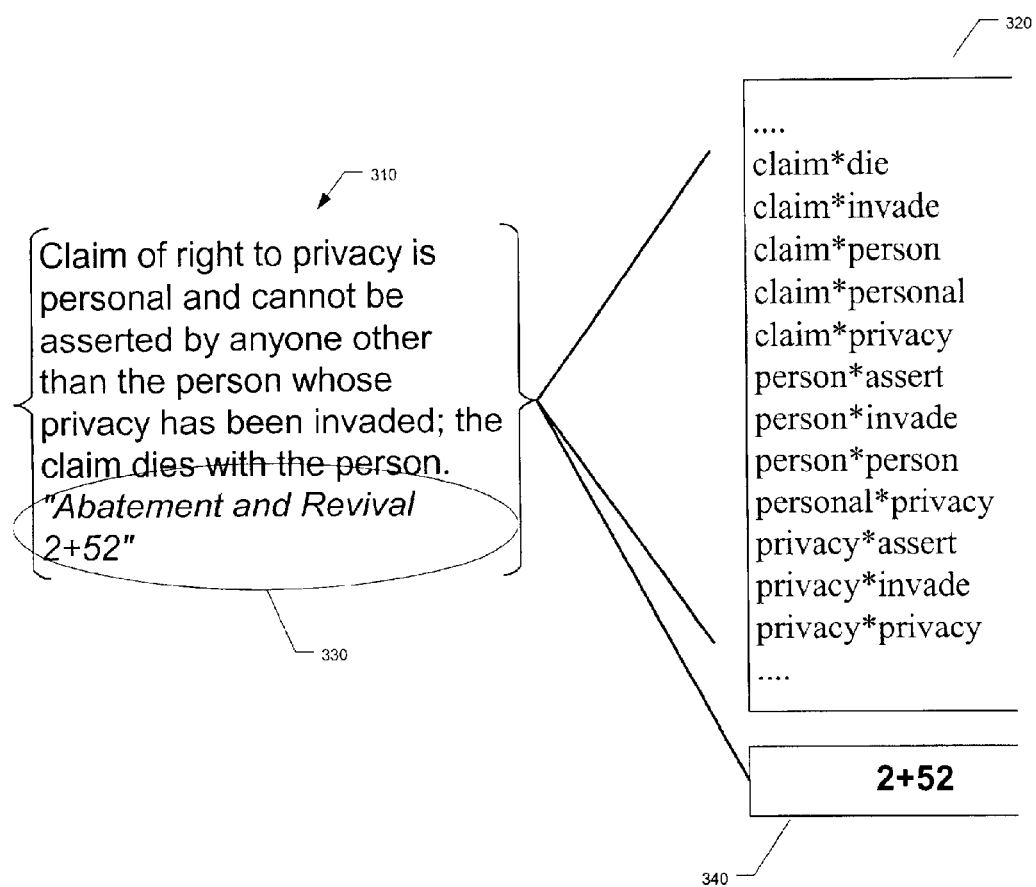
FIG. 3 is a diagram of an exemplary headnote 310 and a corresponding noun-word-pair model 320.

FIG. 3 shows an example of a headnote 310 and a noun-word representation 320 in accord with the exemplary embodiment. Also shown are West Key Number classification text 330 and class identifier 340.

In a particular annotation vector $V_a$, the weight, or magnitude, of any particular element $V_a$ is defined as $$v_a = tf_a^{1*} \; idf_a^1, \tag{1}$$

where $tf_a^1$ denotes the term frequency (that is, the total number of occurrences) of the term or noun-word pair associated with annotation a. (In the exemplary embodiment, this is the number of occurrences of the term within the set of headnotes associated with the annotation.) $idf_a^1$ denotes the inverse document frequency for the associated term or noun-word pair. $idf_a^1$ is defined as $$idf_a' = \log\left(\frac{N}{df_a'}\right), \tag{2}$$

where N is the total number of headnotes (for example, 20 million) in the collection, and $df_a^1$, is the number of headnotes (or more generally documents) containing the term or noun-word pair. The prime ' notation indicates that these frequency parameters are based on proxy text, for example, the text of associated headnotes, as opposed to text of the annotation itself. (However, other embodiments may use all or portions of text from the annotation alone or in combination with proxy text, such as headnotes or other related documents.)

Even though the exemplary embodiment uses headnotes associated with an annotation as opposed to text of the annotation itself, the annotation-text vectors can include a large number of elements. Indeed, some annotation vectors can include hundreds of thousands of terms or noun-word pairs, with the majority of them having a low term frequency. Thus, not only to reduce the number of terms to a manageable number, but also to avoid the rare-word problem known to exist in vector-space models, the exemplary embodiment removes low-weight terms.

Specifically, the exemplary embodiment removes as many low-weight terms as necessary to achieve a lower absolute bound of 500 terms or a 75% reduction in the length of each annotation vector. The effect of this process on the number of terms in an annotation vector depends on their weight distribution. For example, if the terms have similar weights, approximately 75% of the terms will be removed. However, for annotations with skewed weight distributions, as few as 10% of the terms might be removed. In the exemplary embodiment, this process decreased the total number of unique terms for all annotation vectors from approximately 70 million to approximately 8 million terms.

Some other embodiments use other methods to limit vector size. For example, some embodiments apply a fixed threshold on the number of terms per category, or on the term's frequency, document frequency, or weight. These methods are generally efficient when the underlying categories do not vary significantly in the feature space. Still other embodiments perform feature selection based on measures, such as mutual information. These methods, however, are computationally expensive. The exemplary method attempts to strike a balance between these two ends.

Block 220, executed after representation of the annotations as text-based feature vectors, entails modeling one or more input headnotes from database 120 (in FIG. 1) as a set of corresponding headnote-text vectors. The input headnotes include headnotes that have been recently added to headnote database 120 or that have otherwise not previously been reviewed for relevance to the ALR annotations in database 110.

The exemplary embodiment represents each input headnote h as a vector $V_h$, with each element $v_h$, like the elements of the annotation vectors, associated with a term or noun-word pair in the headnote. $v_h$ is defined as $$v_h = tf_h * idf_H, \qquad (3)$$

where $tf_h$ denotes the frequency (that is, the total number of occurrences) of the associated term or noun-word pair in the input headnote, and $idf_H$ denotes the inverse document frequency of the associated term or noun-word pair within all the headnotes.

At block 230, the exemplary method continues with operation of classification processor 130 (in FIG. 1). FIG. 2 shows that block 230 itself comprises sub-process blocks 231–237.

Block 231, which represents operation of classifier 131, entails computing a set of similarity scores based on the similarity of text in each input headnote text to the text associated with each annotation. Specifically, the exemplary embodiment measures this similarity as the cosine of the angle between the headnote vector $V_h$ and each annotation vector $V_a$.

Mathematically, this is expressed as $$S_1 = \cos\theta_{ah} = \frac{V_a' \cdot V_h'}{\|V_a\| \times \|V_h\|}, \qquad (4)$$

where "·" denotes the conventional dot- or inner-product operator, and $V_a^1$ and $V_h^1$ denote that respective vectors $V_a$ and $V_h$ have been modified to include elements corresponding to terms or noun-word pairs found in both the annotation text and the headnote. In other words, the dot product is computed based on the intersection of the terms or noun-word pairs. $\|X\|$ denotes the length of the vector argument. In this embodiment, the magnitudes are computed based on all the elements of the vector.

Block 232, which represents operation of classifier 132, entails determining a set of similarity scores based on the similarity of the class identifiers (or other meta-data) associated with the input headnote and those associated with each of the annotations. Before this determination is made, each annotation a is represented as an annotation-class vector $V_a^C$ vector, with each element $v_a^C$ indicating the weight of a class identifier assigned to the headnotes cited by the annotation. Each element $v_a^C$ is defined as $$v_a^C = tf_a^{C*} idf_a^C, \qquad (5)$$

where $tf_a^C$ denotes the frequency of the associated class identifier, and $idf_a^C$, denotes its inverse document frequency. $idf_a^C$ is defined as $$idf_a^C = \log\left(\frac{N_C}{df_a^C}\right), \qquad (6)$$

where $N_C$ is the total number of classes or class identifiers. In the exemplary embodiment, $N_C$ is 91997, the total number of classes in the West Key Number System. $df^C$ is the frequency of the class identifier amongst the set of class identifiers for annotation a. Unlike the exemplary annotation-text vectors which are based on a selected set of annotation headnotes, the annotation-class vectors use all the class identifiers associated with all the headnotes that are associated with the annotation. Some embodiments may use class-identifier pairs, although they were found to be counterproductive in the exemplary implementation.

Similarly, each input headnote is also represented as a headnote-class vector $V_h^C$, with each element indicating the weight of a class or class identifier assigned to the headnote. Each element $v_h^C$ is defined as $$v_h^C = tf_h^{C*} idf_h^C, \qquad (7)$$

with $tf_h^C$ denoting the frequency of the class identifier, and $idf_h^C$ denoting the inverse document frequency of the class identifier. $idf_h^C$ is defined as $$idf_h^C = \log\left(\frac{N_C}{df_a^C}\right), \qquad (8)$$

where $N_C$ is the total number of classes or class identifiers and $df_h$ is the frequency of the class or class identifier amongst the set of class or class identifiers associated with the annotation.

Once the annotation-class and headnote-class vectors are established, classification processor 130 computes each similarity score $S_2$ as the cosine of the angle between them. This is expressed as $$S_2 = \cos\theta_{ah} = \frac{V_a^C \cdot V_h^C}{\|V_a^C\| \times \|V_h^C\|}, \qquad (9)$$

For headnotes that have more than one associated class identifier, the exemplary embodiment considers each class identifier separately of the others for that headnote, ultimately using the one yielding the maximum class-identifier similarity. The maximization criteria is used because, in some instances, a headnote may have two or more associated class identifiers (or Key Number classifications), indicating its discussion of two or more legal points. However, in most cases, only one of the class identifiers is relevant to a given annotation.

In block 233, classifier 133 determines a set of similarity scores $S_3$ based on the probability that a headnote is associated with a given annotation from class-identifier (or other meta-data) statistics. This probability is approximated by $$S_3 = P(h|a) = P(\{k\}_h | a) = \max_{k' \in \{k\}_h} P(k'|a), \qquad (10)$$

where $\{k\}_h$ denotes the set of class identifiers assigned to headnote h. Each annotation conditional class probability $P(k/a)$ is estimated by $$P(k\mid a) = \frac{1 + tf_{(k,a)}}{|a| + \sum_{k'\in a} tf_{(k',a)}}, \quad (11)$$

where $tf_{(k,a)}$ is the term frequency of the k-th class identifier among the class identifiers associated with the headnotes of annotation a; |a| denotes the total number of unique class identifiers associated with annotation a (that is, the number of samples or cardinality of the set); and $$\sum_{k'\in a} tf_{(k',a)}$$

denotes the sum of the term frequencies for all the class identifiers.

The exemplary determination of similarity scores $S_3$ relies on assumptions that class identifiers are assigned to a headnote independently of each other, and that only one class identifier in $\{k\}_h$ is actually relevant to annotation a. Although the one-class assumption does not hold for many annotations, it improves the overall performance of the system.

Alternatively, one can multiply the conditional class-identifier (Key Number classifications) probabilities for the annotation, but this effectively penalizes headnotes with multiple Key Number classifications (class assignments), compared to those with single Key Number classifications. Some other embodiments use Bayes' rule to incorporate a priori probabilities into classifier 133. However, some experimentation with this approach suggests that system performance is likely to be inferior to that provided in this exemplary implementation.

The inferiority may stem from the fact that annotations are created at different times, and the fact that one annotation has more citations than another does not necessarily mean it is more probable to occur for a given headnote. Indeed, a greater number of citations might only reflect that one annotation has been in existence longer and/or updated more often than another. Thus, other embodiments might use the prior probabilities based on the frequency that class numbers are assigned to the annotations.

In block 234, classifier 134 determines a set of similarity scores $S_4$, based on $P(a|h)$, the probability of each annotation given the text of the input headnote. In deriving a practical expression for computing $P(a|h)$, the exemplary embodiment first assumes that an input headnote h is completely represented by a set of descriptors T, with each descriptor t assigned to a headnote with some probability, $P(t|h)$. Then, based on the theory of total probability and Bayes' theorem, $P(a|h)$ is expressed as $$P(a\mid h) = \sum_{t\in T} P(a\mid h,t)P(t\mid h) \quad (12)$$
$$= \sum_{t\in T} \frac{P(h\mid a,t)P(a\mid t)}{P(h\mid t)} P(t\mid h).$$

Assuming that a descriptor is independent of the class identifiers associated with a headnote allows one to make the approximation:

$$P(h|a,t) \approx P(h|t) \quad (13)$$

and to compute the similarity scores $S_4$ according to $$S_4 = P(a\mid h) = \sum_{t\in T} P(t\mid h)P(a\mid t) \quad (14)$$

where $P(t|h)$ is approximated by $$P(t\mid h) = \frac{tf_{(t,h)}}{\sum_{t'\in T} tf_{(t',h)}}. \quad (15)$$

$tf_{(t,h)}$ denotes the frequency of term t in the headnote and $$\sum_{t'\in T} tf_{(t',h)}$$

denotes the sum of the frequencies of all terms in the headnote. $P(a|t)$ is defined according to Bayes' theorem as $$P(a\mid t) = \frac{P(t\mid a)P(a)}{\sum_{a'\in A} P(t\mid a')P(a')}, \quad (16)$$

where $P(a)$ denotes the prior probability for annotation a, and $P(t|a)$, the probability of a discriminator t given annotation a, is estimated as $$P(t\mid a) \cong \frac{1}{|a|} \sum_{h\in a} P(t\mid h), \quad (17)$$

and $$\sum_{a'\in A}$$

denotes summation over all annotations a' in the set of annotations A. Since all the annotation prior probabilities $P(a)$ and $P(a')$ are assumed to be equal, $P(a|t)$ is computed using $$P(a\mid t) = \frac{P(t\mid a)}{\sum_{a'\in A} P(t\mid a')}. \quad (18)$$

Block 235, which represents operation of composite-score generator 135, entails computing a set of composite similarity scores $CS_a^h$ based on the sets of similarity scores determined at blocks 231–235 by classifiers 131–135, with each composite score indicating the similarity of the input headnote h to each annotation a. More particularly, generator 135 computes each composite score $CS_a^h$ according to $$CS_a^h = \sum_{i=1}^{4} w_{ia} S_{a,i}^h, \quad (19)$$

where $S_{a,i}^h$ denotes the similarity score of the i-th similarity score generator for the input headnote h and annotation a, and $w_{ia}$ is a weight assigned to the i-th similarity score generator and annotation a. Thus, $w_{ia}$ is a weight specific to the i-th similarity score generator and to annotation (or class) a. Execution of the exemplary method then continues at block 236.

At block 236, assignment decision-maker 136 recommends that the input headnote or a document, such as a case, associated with the headnote be classified or incorporated into one or more of the annotations based on the set of composite scores and decision criteria within decision-criteria module 137. In the exemplary embodiments, the headnote is assigned to annotations according to the following decision rule:

If $CS_a^h > \Gamma_a$, then recommend assignment of h or $D_h$ to annotation a, (20) where $\Gamma_a$ is an annotation-specific threshold from decision-criteria module 137 and $D_h$ denotes a document, such as a legal opinion, associated with the headnote. (In the exemplary embodiment, each ALR annotation includes the text of associated headnotes and its full case citation.)

The annotation-classifier weights $w_{ia}$, for i=1 to 4, a∈A, and the annotation thresholds $\Gamma_a$, a∈A, are learned during a tuning phase. The weights, $0 \leq w_{ia} \leq 1$, reflect system confidence in the ability of each similarity score to route to annotation a. Similarly, the annotation thresholds $\Gamma_a$, a∈A, are also learned and reflect the homogeneity of an annotation. In general, annotations dealing with narrow topics tend to have higher thresholds than those dealing with multiple related topics.

In this ALR embodiment, the thresholds reflect that, over 90% of the headnotes (or associated documents) are not assigned to any annotations. Specifically, the exemplary embodiment estimates optimal annotation-classifier weights and annotation thresholds through exhaustive search over a five-dimensional space. The space is discretized to make the search manageable. The optimal weights are those corresponding to maximum precision at recall levels of at least 90%.

More precisely, this entails trying every combination of four weight variables, and for each combination, trying 20 possible threshold values over the interval [0,1]. The combination of weights and threshold that yields the best precision and recall is then selected. The exemplary embodiment excludes any weight-threshold combinations resulting in less than 90% recall.

To achieve higher precision levels, the exemplary embodiment effectively requires assignments to compete for their assigned annotations or target classifications. This competition entails use of the following rule:

$$\text{Assign h to a, iff } CS_a^h > \alpha \hat{S} \quad (21)$$

where α denotes an empirically determined value greater than zero and less than 1, for example, 0.8; $\hat{S}$ denotes the maximum composite similarity score associated with a headnote in $\{H_a\}$, the set of headnotes assigned to annotation a.

Block 240 entails processing classification recommendations from classification processor 130. To this end, processor 130 transfers classification recommendations to preliminary classification database 140 (shown in FIG. 1). Database 140 sorts the recommendation based on annotation, jurisdiction, or other relevant criteria and stores them in, for example, a single first-in-first-out (FIFO) queue, as multiple FIFO queue based on single annotations or subsets of annotations.

One or more of the recommendations are then communicated by request or automatically to workcenter 150, specifically workstations 152, 154, and 156. Each of the workstations displays, automatically or in response to user activation, one or more graphical-user interfaces, such as graphical-user interface 152.1.

Figure 4:
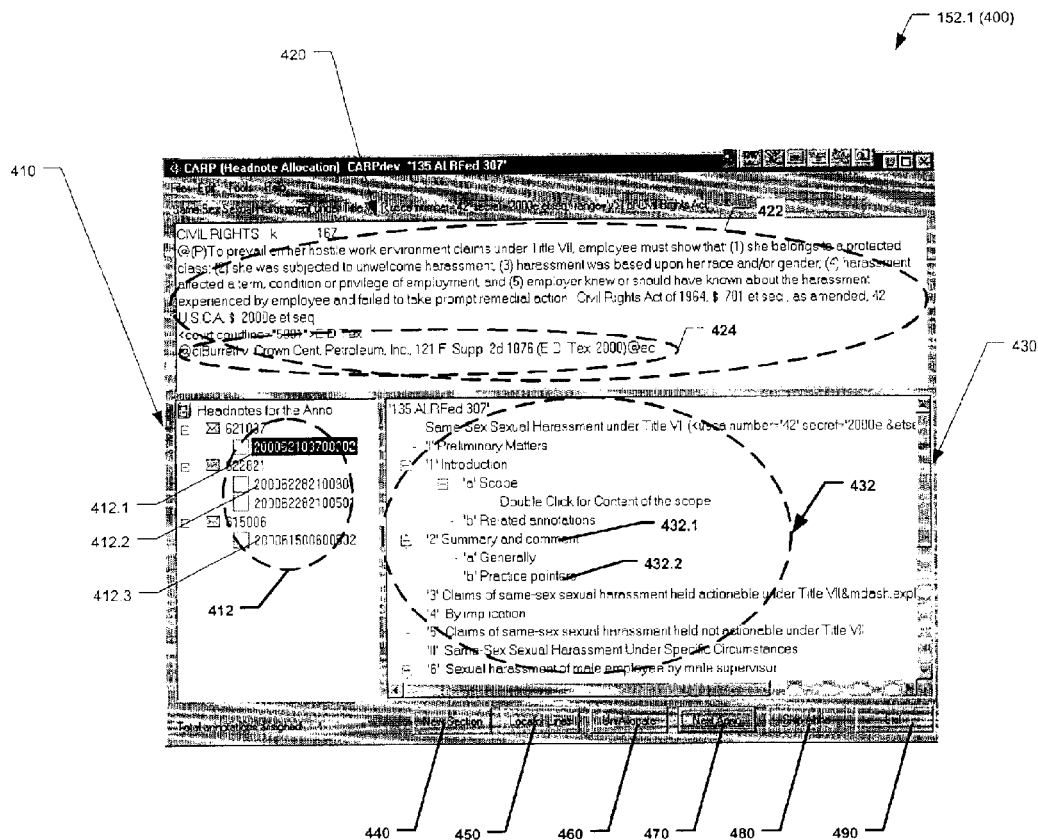
FIG. 4 is a facsimile of an exemplary graphical user interface 400 that forms a portion of classification system 100.

FIG. 4 shows an exemplary form of graphical-user interface 152.1. Interface 152.1 includes concurrently displayed windows or regions 410, 420, 430 and buttons 440–490.

Window 410 displays a recommendation list 412 of headnote identifiers from preliminary classification database 140. Each headnote identifier is logically associated with at least one annotation identifier (shown in window 430). Each of the listed headnote identifiers is selectable using a selection device, such as a keyboard or mouse or microphone. A headnote identifier 412.1 in list 412 is automatically highlighted, by for example, reverse-video presentation, upon selection. In response, window 420 displays a headnote 422 and a case citation 424, both of which are associated with each other and the highlighted headnote identifier 412.1. In further response, window 430 displays at least a portion or section of an annotation outline 432 (or classification hierarchy), associated with the annotation designated by the annotation identifier associated with headnote 412.1.

Button 440, labeled "New Section," allows a user to create a new section or subsection in the annotation outline. This feature is useful, since in some instances, a headnote suggestion is good, but does not fit an existing section of the annotation. Creating the new section or subsection thus allows for convenient expansion of the annotation.

Button 450 toggles on and off the display of a text box describing headnote assignments made to the current annotation during the current session. In the exemplary embodiment, the text box presents each assignment in a short textual form, such as <annotation or class identifier><subsection or section identifier><headnote identifier>. This feature is particularly convenient for larger annotation outlines that exceed the size of window 430 and require scrolling contents of the window.

Button 460, labeled "Un-Allocate," allows a user to de-assign, or declassify, a headnote to a particular annotation. Thus, if a user changes her mind regarding a previous, unsaved, classification, the user can nullify the classification. In some embodiments, headnotes identified in window 410 are understood to be assigned to the particular annotation section displayed in window 430 unless the user decides that the assignment is incorrect or inappropriate. (In some embodiments, acceptance of a recommendation entails automatic creation of hyperlinks linking the annotation to the case and the case to the annotation.)

Button 470, labeled "Next Annotation," allows a user to cause display of the set of headnotes recommended for assignment to the next annotation. Specifically, this entails not only retrieving headnotes from preliminary classification storage 140 and displaying them in window 410, but also displaying the relevant annotation outline within window 430.

Button 480, labeled "Skip Anno," allows a user to skip the current annotation and its suggestions altogether and advance to the next set of suggestions and associated annotation. This feature is particularly useful when an editor wants another editor to review assignments to a particular annotation, or if the editor wants to review this annotation at another time, for example, after reading or studying the entire annotation text, for example. The suggestions remain in preliminary classification database 140 until they are either reviewed or removed. (In some embodiments, the suggestions are time-stamped and may be supplanted with more current suggestions or deleted automatically after a preset period of time, with the time period, in some variations dependent on the particular annotation.)

Button 490, labeled "Exit," allows an editor to terminate an editorial session. Upon termination, acceptances and recommendations are stored in ALR annotations database 110.

FIG. 2 shows that after processing of the preliminary classifications, execution of the exemplary method continues at block 250. Block 250 entails updating of classification decision criteria. In the exemplary embodiment, this entails counting the numbers of accepted and rejected classification recommendations for each annotation, and adjusting the annotation-specific decision thresholds and/or classifier weights appropriately. For example, if 80% of the classification recommendations for a given annotation are rejected during one day, week, month, quarter or year, the exemplary embodiment may increase the decision threshold associated with that annotation to reduce the number of recommendations. Conversely, if 80% are accepted, the threshold may be lowered to ensure that a sufficient number of recommendations are being considered.

Exemplary System for Classifying Headnotes to American Jurisprudence

Figure 5:
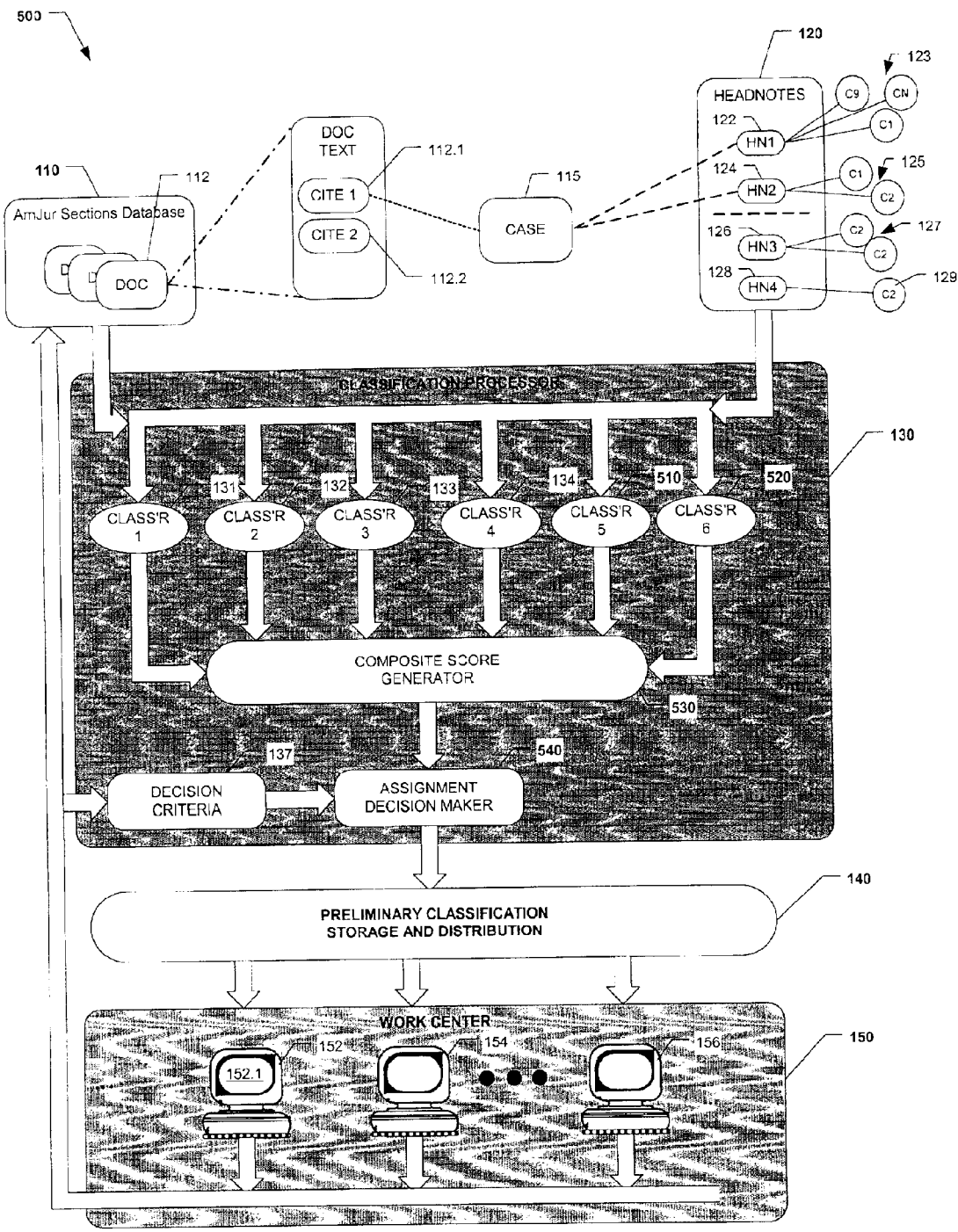
FIG. 5 is a diagram of another exemplary classification system 500, which is similar to system 100 but includes additional classifiers.

FIG. 5 shows a variation of system 100 in the form of an exemplary classification system 500 tailored to facilitate classification of documents to one or more of the 135,000 sections of The American Jurisprudence (AmJur). Similar to an ALR annotation, each AmJur section cites relevant cases as they are decided by the courts. Likewise, updating AmJur is time consuming.

In comparison to system 100, classification system 500 includes six classifiers: classifiers 131–134 and classifiers 510 and 520, a composite score generator 530, and assignment decision-maker 540. Classifiers 131–134 are identical to the ones used in system 100, with the exception that they operate on AmJur data as opposed to ALR data.

Classifiers 510 and 520 process AmJur section text itself, instead of proxy text based on headnotes cited within the AmJur section. More specifically, classifier 510 operates using the formulae underlying classifier 131 to generate similarity measurements based on the tf-idfs (term-frequency-inverse document frequency) of noun-word pairs in AmJur section text. And classifier 520 operates using the formulae underlying classifier 134 to generate similarity measurements based on the probabilities of a section text given the input headnote.

Once the measurements are computed, each classifier assigns each AmJur section a similarity score based on a numerical ranking of its respective set of similarity measurements. Thus, for any input headnote, each of the six classifiers effectively ranks the 135,000 AmJur sections according to their similarities to the headnote. Given the differences in the classifiers and the data underlying their scores, it is unlikely that all six classifiers would rank the most relevant AmJur section the highest; differences in the classifiers and the data they use generally suggest that this will not occur. Table 1 shows a partial ranked listing of AmJur sections showing how each classifier scored, or ranked, their similarity to a given headnote.

Composite score generator 530 generates a composite similarity score for each AmJur section based on its corresponding set of six similarity scores. In the exemplary embodiment, this entails computing the median of the six scores for each AmJur section. However, other embodiments can compute a uniform or non-uniformly weighted average of all six or a subset of the six rankings. Still other embodiments can select the maximum, minimum, or mode as the composite score for the AmJur section. After generating the composite scores, the composite score generator forwards data identifying the AmJur section associated with the highest composite score, the highest composite score, and the input headnote to assignment decision-maker 540.

Assignment decision-maker 540 provides a fixed portion of headnote-classification recommendations to preliminary classification database 140, based on the total number of input headnotes per a fixed time period. The fixed number and time period governing the number of recommendations are determined according to parameters within decision-criteria module 137. For example, one embodiment ranks all incoming headnotes for the time period, based on their composite scores and recommends only those headnotes that rank in the top 16 percent.

In some instances, more than one headnote may have a composite score that equals a given cut-off threshold, such as top 16%. To ensure greater accuracy in these circumstances, the exemplary embodiment re-orders all headnote-section pairs that coincide with the cut-off threshold, using the six actual classifier scores.

This entails converting the six classifier scores for a particular headnote-section pair into six Z-scores and then multiplying the six Z-scores for a particular headnote-section pair to produce a single similarity measure. (Z-scores are obtained by assuming that each classifier score has a normal distribution, estimating the mean and standard deviation of the distribution, and then subtracting the mean from the classifier score and dividing the result by the standard deviation.) The headnote-section pairs that meet the acceptance criteria are than re-ordered, or re-ranked, according to this new similarity measure, with as many as needed to achieve the desired number of total recommendations being forwarded to preliminary classification database 140. (Other embodiments may apply this "reordering" to all of the headnote-section pairs and then filter these based on the acceptance criteria necessary to obtain the desired number of recommendations.)

TABLE 1

Partial Ranked Listing AmJur Sections based of Median of Six Similarity Scores

| Section | C1 Ranks | C2 Ranks | C3 Ranks | C4 Ranks | C5 Ranks | C6 Ranks | Median Ranks |
|---|---|---|---|---|---|---|---|
| Section_1 | 1 | 8 | 4 | 1 | 3 | 2 | 2.5 |
| Section_2 | 3 | 2 | 5 | 9 | 1 | 3 | 3 |
| Section_3 | 2 | 4 | 6 | 5 | 4 | 4 | 4 |
| Section_4 | 5 | 1 | 3 | 8 | 6 | 1 | 4 |
| Section_5 | 7 | 3 | 2 | 2 | 5 | 5 | 4 |
| Section_6 | 4 | 5 | 1 | 7 | 2 | 9 | 4.5 |
| Section_7 | 8 | 7 | 8 | 4 | 7 | 6 | 7 |
| Section_8 | 6 | 9 | 7 | 3 | 10 | 7 | 7 |
| Section_9 | 9 | 10 | 9 | 6 | 9 | 10 | 9 |
| Section_10 | 10 | 6 | 10 | 10 | 8 | 8 | 9 |

Exemplary System for Classifying Headnotes to West Key Number System

Figure 6:
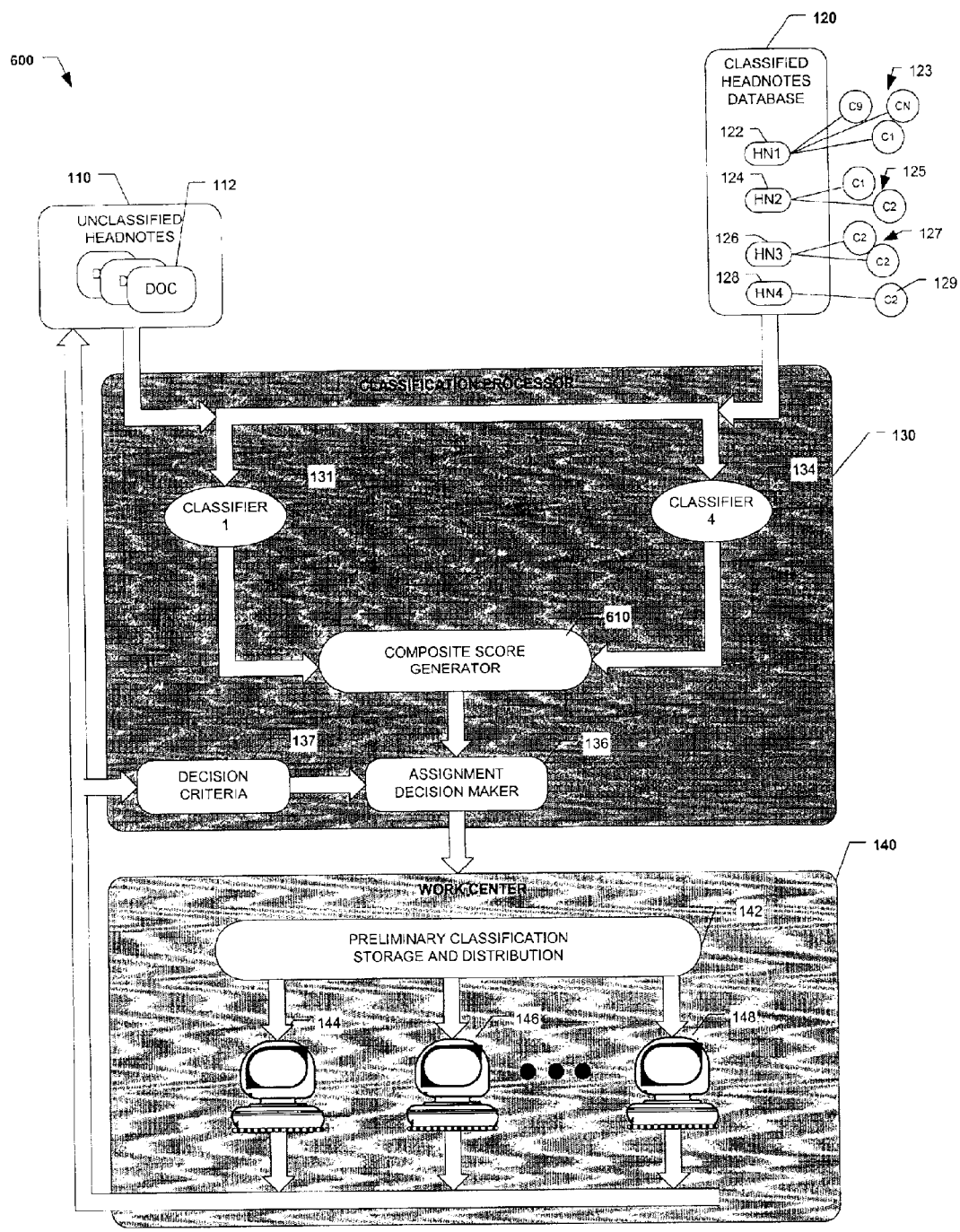
FIG. 6 is a diagram of another exemplary classification system 600, which is similar to system 100 but omits some classifiers.
Figure 2:
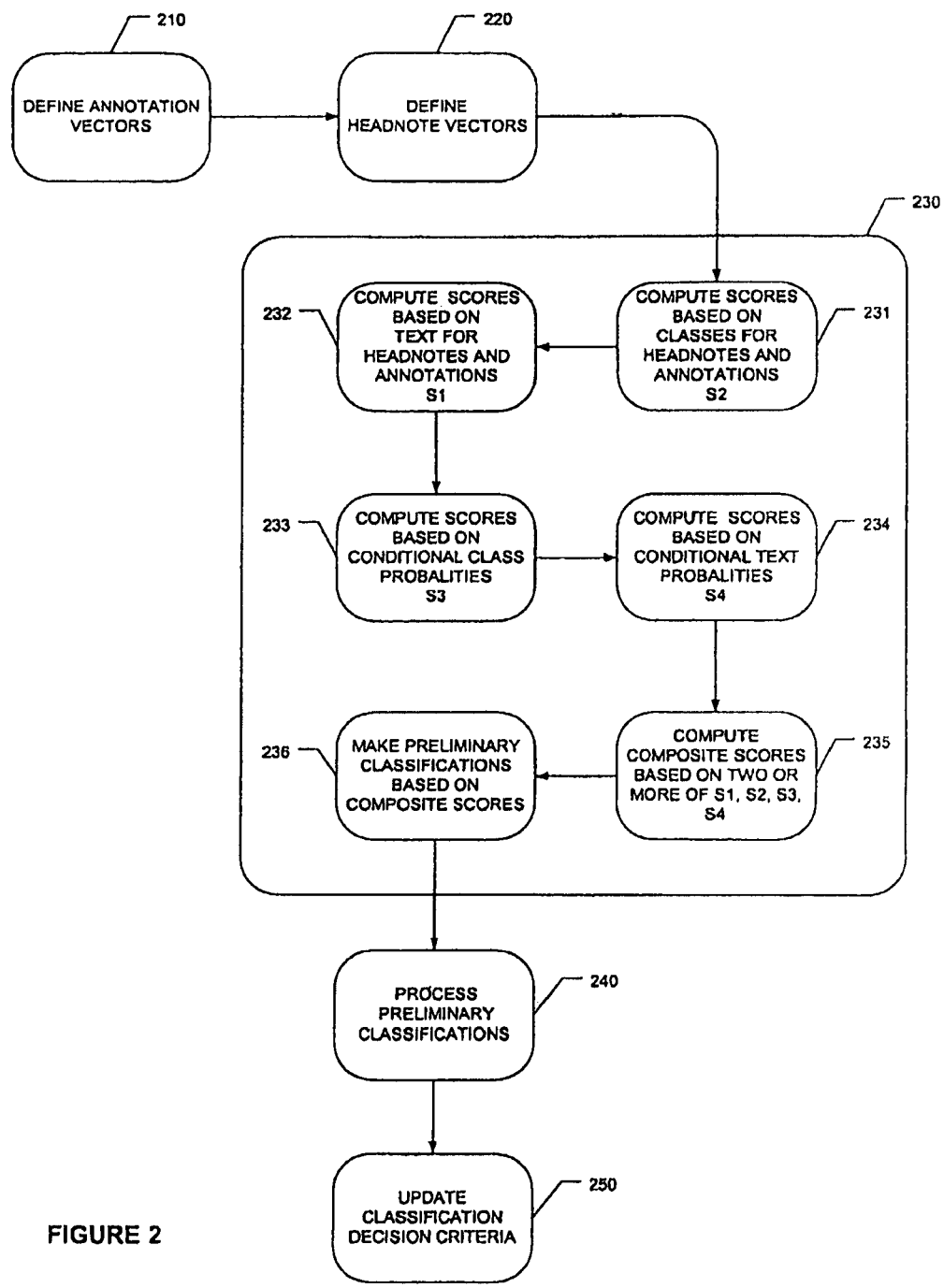

FIG. 6 shows another variation of system 100 in the form of an exemplary classification system 600 tailored to facilitate classification of input headnotes to classes of the West Key Number System. The Key Number System is a hierarchical classification system with 450 top-level classes, which are further subdivided into 92,000 sub-classes, each having a unique class identifier. In comparison to system 100, system 600 includes classifiers 131 and 134, a composite score generator 610, and an assignment decision-maker 620.

In accord with previous embodiments, classifiers 131 and 134 model each input headnote as a feature vector of noun-word pairs and each class identifier as a feature vector of noun-word pairs extracted from headnotes assigned to it. Classifier 131 generates similarity scores based on the tf-idf products for noun-word pairs in headnotes assigned to each class identifier and to a given input headnote. And classifier 134 generates similarity scores based on the probabilities of a class identifier given the input headnote. Thus, system 600 generates over 184,000 similarity scores, with each scores representing the similarity of the input headnote to a respective one of the over 92,000 class identifiers in the West Key Number System using a respective one of the two classifiers.

Composite score generator 610 combines the two similarity measures for each possible headnote-class-identifier pair to generate a respective composite similarity score. In the exemplary embodiment, this entails defining, for each class or class identifier, two normalized cumulative histograms (one for each classifier) based on the headnotes already assigned to the class. These histograms approximate corresponding cumulative density functions, allowing one to determine the probability that a given percentage of the class identifiers scored below a certain similarity score.

More particularly, the two cumulative normalized histograms for class-identifier c, based on classifiers 131 and 134 are respectively denoted $F_c^1$ and $F_c^2$, and estimated according to:

$$F_c^1(s) = F_c^1(s - 0.01) + \frac{1}{M_c} * \left| \{h_t \mid S_t^1 = s\} \right| \quad (22)$$

and $$F_c^2(s) = F_c^2(s - 0.01) + \frac{1}{M_c} * \left| \{h_t \mid S_t^2 = s\} \right|, \quad (23)$$

where c denotes a particular class or class identifier; s =0, 0.01, 0.02, 0.03, . . . ,1.0; F(s<0)=0; $M_C$ denotes the number of headnotes classified to or associated with class or class identifier c; |{B}| denotes the number of elements in the set B h, , i =1, . . . , $M_C$ denotes the set of headnotes already classified or associated with class or class identifier c; $S_1^1$ denotes the similarity score for headnote $h_1$ and class-identifier c, as measured by classifier 131, and $S_1^2$ denote the similarity score for headnote $h_1$ and class-identifier c, as measured by classifier 134. (In this context, each similarity score indicates the similarity of a given assigned headnote to all the headnotes assigned to class c.) In other words, $|\{h_1|S_1^1=s\}|$ denotes the number of headnotes assigned to class c that received a score of s from classifier 131, and $|\{h_1|S_1^2=s\}|$ denotes the number of headnotes assigned to class c that received a score of s from classifier 134.

Thus, for every possible score value (between 0 and 1 with a particular score spacing), each histogram provides the percentage of assigned headnotes that scored higher and lower than that particular score. For example, for classifier 131, the histogram for class identifier c might show that 60% of the set of headnotes assigned to classifier c scored higher than 0.7 when compared to the set of headnotes as a whole; whereas for classifier 134 the histogram might show that 50% of the assigned headnotes scored higher than 0.7.

Next, composite score generator 610 converts each score for the input headnote into a normalized similarity score using the corresponding histogram and computes each composite score for each class based on the normalized scores. In the exemplary embodiment, this conversion entails mapping each classifier score to the corresponding histogram to determine its cumulative probability and then multiplying the cumulative probabilities of respective pairs of scores associated with a given class c to compute the respective composite similarity score. The set of composite scores for the input headnote are then processed by assignment decision-maker 620.

Assignment decision maker 620 forwards a fixed number of the top scoring class identifiers to preliminary classification database 140. The exemplary embodiments suggest the class identifiers having the top five composite similarity scores for every input headnote.

OTHER EXEMPLARY EMBODIMENTS

The components of the various exemplary systems presented can be combined in myriad ways to form other classification systems of both greater and lesser complexity. Additionally, the components and systems can be tailored for other types of documents other than headnotes. Indeed, the components and systems and embodied teachings and principles of operation are relevant to virtually any text or data classification context.

For example, one can apply one or more of the exemplary systems and related variations to classify electronic voice and mail messages. Some mail classifying systems may include one or more classifiers in combination with conventional rules which classify messages as useful or SPAM based on whether the sender is in your address book, same domain as recipient, etc.

APPENDIX A

EXEMPLARY STOP WORDS a a.m ab about above accordingly across ad after afterward afterwards again against ago ah ahead ain't all allows almost alone along already all right also although always am among amongst an and and/or anew another ante any anybody anybody's anyhow anymore anyone anyone's anything anything's anytime anytime's anyway anyways anywhere anywhere's anywise appear approx are aren't around as aside associated at available away awfully awhile b banc be became because become becomes becoming been before beforehand behalf behind being below beside besides best better between beyond both brief but by bythe c came can can't cannot cant cause causes certain certainly cetera cf ch change changes cit cl clearly cmt co concerning consequently consider contain containing contains contra corresponding could couldn't course curiam currently d day days dba de des described di did didn't different divers do does doesn't doing don't done down downward downwards dr du during e e.g each ed eds eg eight eighteen eighty either eleven else elsewhere enough especially et etc even ever evermore every everybody everybody's everyone everyone's everyplace everything everything's everywhere evervhere's example except f facie facto far few fewer fide fides followed following follows for forma former formerly forth forthwith fortiori fro from further furthermore g get gets getting given gives go goes going gone got gotten h had hadn't happens hardly has hasn't have haven't having he he'd he'll he's hello hence henceforth her here here's hereabout hereabouts hereafter herebefore hereby herein hereinafter hereinbefore hereinbelow hereof hereto heretofore hereunder hereunto hereupon herewith hers herself hey hi him himself his hither hitherto hoc hon how howbeit however howsoever hundred i i'd i'll i'm i've i.e ibid ibidem id ie if ignored ii iii illus immediate in inasmuch inc indeed indicate indicated indicates infra initio insofar instead inthe into intra inward ipsa is isn't it it's its itself iv ix j jr judicata just k keep kept kinda know known knows l la last later latter latterly le least les less lest let let's like likewise little looks ltd m ma'am many may maybe me meantime meanwhile mero might million more moreover most mostly motu mr mrs ms much must my myself name namely naught near necessary neither never nevermore nevertheless new next no no-one nobody nohow nolo nom non none nonetheless noone nor-normally nos not nothing novo now nowhere o o'clock of ofa off offhis oft often ofthe ofthis oh on once one one's ones oneself only onthe onto op or other others otherwise ought our ours ourself ourselves out outside over overall overly own p p.m p.s par para paras pars particular particularly passim per peradventure percent perchance perforce perhaps pg pgs placed please plus possible pp probably provides q quite r rata rather really rel relatively rem res resp respectively right s sa said same says se sec seem seemed seeming seems seen sent serious several shall shalt she she'll she's should shouldn't since sir so some somebody somebody's somehow someone someone's something something's sometime sometimes somewhat somewhere somewhere's specified specify specifying still such sundry sup t take taken tam than that that's thats the their theirs them themselves then thence thenceforth thenceforward there there's thereafter thereby therefor therefore therefrom therein thereof thereon theres thereto theretofore thereunto thereupon therewith these they they'll thing things third this thither thorough thoroughly those though three through throughout thru thus to to-wit together too toward towards u uh unless until up upon upward upwards used useful using usually v v.s value various very vi via vii viii virtually vs w was wasn't way we we'd we'll we're we've well went were weren't what what'll what's whatever whatsoever when whence whenever where whereafter whereas whereat whereby wherefore wherefrom wherein whereinto whereof whereon wheresoever whereto whereunder whereunto whereupon wherever wherewith whether which whichever while whither who who'd who'll who's whoever whole wholly wholy whom whose why will with within without won't would wouldn't x y y'all ya'll ye yeah yes yet you you'll you're you've your yours yourself yourselves z.

CONCLUSION

In furtherance of the art, the inventors have presented various exemplary systems, methods, and software which facilitate the classification of text, such as headnotes or associated legal cases to a classification system, such as that represented by the nearly 14,000 ALR annotations. The exemplary system classifies or makes classification recommendations based on text and class similarities and probabilistic relations. The system also provides a graphical-user interface to facilitate editorial processing of recommended classifications and thus automated update of document collections, such as the American Legal Reports, American Jurisprudence, and countless others.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

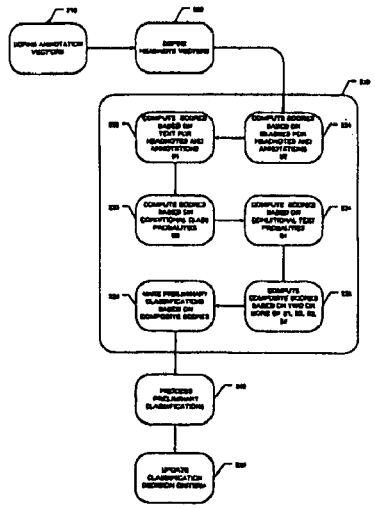

What is claimed is:

1. An automated method of classifying input text to a target classification system having two or more target classes, the method comprising:
   for each target class:
      providing at least first and second class-specific weights and a class-specific decision threshold;
      using at least first and second classification methods to determine respective first and second scores based on the input text and the target class;
      determining a composite score based on the first score scaled by the first class-specific weight for the target class and the second score scaled by the second class-specific weight for the target class; and
      classifying or recommending classification of the input text to the target class based on the composite score and the class-specific decision threshold.

2. The method of claim 1, wherein at least one of the first and second scores is based on a set of one or more noun-word pairs associated with the input text and a set of one or more noun-word pairs associated with the target class, with at least one noun-word pair in each set including a noun and a non-adjacent word.

3. The method of claim 1, wherein providing each first and second class-specific weight and class-specific decision thresholds comprises searching for a combination of first and second class-specific weights and class-specific decision threshold that yield a predetermined level of precision at a predetermined level of recall based on text classified to the target classification system.

4. The method of claim 1, wherein a non-target classification system includes two or more non-target classes, and at least one of the first and second scores is based on one or more of the non-target classes that are associated with the input text and one or more of the non-target classes that are associated with the target class.

5. The method of claim 4:
   wherein the input text is a headnote for a legal document; and
   wherein the target classification system and the non-target classification system are legal classification systems.

6. The method of claim 1, wherein the target classification system includes over 1000 target classes.

7. Tho method of claim 1, further comprising:
   displaying a graphical user interface including first and second regions, with the first region displaying or identifying at least a portion of the input text and the second region displaying information regarding the target classification system and at least one target class for which the input text was recommended for classification; and
   displaying a selectable feature on the graphical user interface, wherein selecting the feature initiates classification of the input text to the one target class.

8. A machine-readable medium comprising instructions for performing an automated method of classifying input text to a target classification system having two or more target classes, the medium including instructions that for each target class can cause:
   providing at least first and second class-specific weights and a class-specific decision threshold;

using at least first and second classification methods to determine respective first and second scores based on the input text and the target class;

determining a composite score based on the first score scaled by the first class-specific weight for the target class and the second score scaled by the second class-specific weight for the target class; and classifying or recommending classification of the input text to the target class based on the composite score and the class-specific decision threshold.

9. An automated method of classifying input text to a target classification system having two or more target classes, the method comprising: for each target class:

determining first and second scores based on the input text and the target class and respective first and second classification methods;

determining a composite score based on the first score scaled by a first class-specific weight for the target class and the second score scaled by a second class-specific weight for the target class; and determining whether to identify the input text for classification to the target class based on the composite score and a class-specific decision threshold for the target class.

10. The method of claim 9, wherein at least one of the first and second scores is based on a set of one or more noun-word pairs associated with the input text and a set of one or more noun-word pairs associated with the target class, with at least one noun-word pair in each set including a noun and a non-adjacent word.

11. The method of claim 9, wherein determining the first and second scores comprises determining any two of:

a score based on similarity of at least one or more portions of the input text to text associated with the target class;

a score based on similarity of a set of one or more non-target classes associated with the input text and a set of one or more non-target classes associated with the target class;

a score based on probability of the target class given a set of one or more non-target classes associated with the input text; and a score based on probability of the target class given at least a portion of the input text.

12. The method of claim 11, wherein each target class is a document and the text associated with the target class comprises text of the document or text of another document associated with the target class.

13. The method of claim 9:

wherein determining the first and second scores for each target class comprises:

determining the first score based on similarity of at least one or more portions of the input text to text associated with the target class; and determining the second score based on similarity of a set of one or more non-target classes associated with the input text and a set of one or more non-target classes associated with the target class;

wherein the method further comprises determining for each target class:

a third score based on probability of the target class given a set of one or more non-target classes associated with the input text; and a fourth score based on probability of the target class given at least a portion of the input text; and wherein the composite score is further based on the third score scaled by a third class-specific weight for the target class and the fourth score scaled by a fourth class-specific weight for the target class.

14. The method of claim 9:

wherein the input text is associated with first meta-data and each target class is associated with second meta-data; and wherein at least one of the first and second scores is based on the first meta-data and the second meta-data.

15. The method of claim 14, wherein the first meta-data comprises a first set of non-target classes that are associated with the input text and the second meta-data comprises a second set of non-target classes that are associated with the target class.

16. A machine-readable medium comprising instructions for performing an automated method of classifying input text to a target classification system having two or more target classes, the medium including instructions for:

determining for each target class first and second scores based on the input text and the target class and respective first and second classification methods;

determining for each target class a composite score based on the first score scaled by a first class-specific weight for the target class and the second score scaled by a second class-specific weight for the target class; and determining for each target class whether to identify the input text for classification to the target class based on the composite score and a class-specific decision threshold for the target class.

17. A system for classifying input text to a target classification system having two or more target classes, the system comprising:

means for determining for each of the target classes at least first and second scores based on the input text and the target class and respective first and second classification methods;

means for determining for each of the target classes a corresponding composite score based on the first score scaled by a first class-specific weight for the target class and the second score scaled by a second class-specific weight for the target class; and means for determining for each of the target classes whether to classify or recommend classification of the input text to the target class based on the corresponding composite score and a class-specific decision threshold for the target class.

* * * * *

UNITED STATES PATENT AND TRADEMARK OFFICE
CERTIFICATE OF CORRECTION

PATENT NO.       : 7,062,498 B2
APPLICATION NO. : 10/027914
DATED            : June 13, 2006
INVENTOR(S)      : Al-Kofahi et al.

It is certified that error appears in the above-identified patent and that said Letters Patent is hereby corrected as shown below:

On the title page, item (56), under "Foreign Patent Documents", in column 2, line 1, after "11/2000" insert -- G06F 17/30 --.

On the title page, item (56), under "Other Publications", in column 2, line 1, delete "et al," and insert -- et al., --, therefor.

On the title page, item (74), "Attorney, Agent, or Firm", in column 2, line 1, delete "Lunberg," and insert -- Lundberg, --, therefor.

On page 2, item (56), under "Other Publications", in column 1, line 1, delete "et al," and insert -- et al., --, therefor.

On page 2, item (56), under "Other Publications", in column 1, line 4, delete "et al," and insert -- et al., --, therefor.

On page 2, item (56), under "Other Publications", in column 1, line 13, delete "Managment" and insert -- Management --, therefor.

On page 2, item (56), under "Other Publications", in column 2, line 28, delete "224–321." and insert -- 224–231. --, therefor.

On Sheet 2 of 6, in Fig. 2 (Block – 232), line 1, delete "COMPUT≡" and insert -- COMPUTE --, therefor.

On Sheet 2 of 6, in Fig. 2 (Block – 232), line 2, delete "BAS≡D" and insert -- BASED --, therefor.

In column 2, line 35, after "computing and" delete "and".

In column 2, line 64, delete "320." and insert -- 320; --, therefor.

In column 2, line 67, delete "100." and insert -- 100; --, therefor.

In column 4, line 8, delete "Exemplary Headnote" and insert -- Exemplary Headnote: -- as a new heading on line 9.

In column 4, line 14, delete "supenor" and insert -- superior --, therefor.

CERTIFICATE OF CORRECTION (continued)
U.S. Pat. No. 7,062,498 B2

In column 4, line 14, after "authority" insert -- . --.

In column 4, line 15, after "identifier" insert -- : --.

In column 6, line 23, delete "$V_a$" and insert -- $v_a$ --, therefor.

In column 6, line 25, delete "$v_a = tf_a^1 * idf_a^1$," and insert -- $v_a = tf_a^I * idf_a^I$ , --, therefor.

In column 6, line 26, delete "$tf_a^1$" and insert -- $tf_a^I$ --, therefor.

In column 6, line 31, delete "$idf_a^1$" and insert -- $idf_a^I$ --, therefor.

In column 6, line 32, delete "$idf_a^1$" and insert -- $idf_a^I$ --, therefor.

In column 6, line 39, delete "$df_a^1$," and insert -- $df_a^I$ --, therefor.

In column 7, line 49, delete ""-"" and insert -- "." --, therefor.

In column 7, line 50, delete "$V_a^1$" and insert -- $V_a^I$ --, therefor.

In column 7, line 50, delete "$V_h^1$" and insert -- $V_h^I$ --, therefor.

In column 7, line 54, delete "teems" and insert -- terms --, therefor.

In column 7, line 64, delete "$V_a^C$" and insert -- $V_a^C$ --, therefor.

In column 7, line 64, delete "$V_a^C$" and insert -- $V_a^C$ --, therefor.

In column 7, line 66, delete "$V_a^C$" and insert -- $V_a^C$ --, therefor.

In column 7, line 67, delete "$v_a^C = tf_a^C * idf_a^C$," and insert -- $v_a^C = tf_a^C * idf_a^C$ , --, therefor.

In column 8, line 1, delete "$tf_a^C$" and insert -- $tf_a^C$ --, therefor.

In column 8, line 2, delete "$idf_a^C$" and insert -- $idf_a^C$ --, therefor.

In column 8, line 3, delete "$idf_a^C$" and insert -- $idf_a^C$ --, therefor.

In column 8, line 21, delete "$V_h^C$" and insert -- $v_h^C$ --, therefor.

In column 8, line 23, delete "$v_h^C$" and insert -- $v_h^C$ --, therefor.

In column 8, line 25, delete "$v_h^C = tf_h^C * idf_h^C$," and insert -- $v_h^C = tf_h^C \cdot idf_h^C$ , --, therefor.

CERTIFICATE OF CORRECTION (continued)
U.S. Pat. No. 7,062,498 B2

In column 8, line 26, delete "$tf_h^C$" and insert -- $tf_h^C$ --, therefor.

In column 8, line 27, delete "$idf_h^C$" and insert -- $idf_h^C$ --, therefor.

In column 8, line 28, delete "$idf_h^C$" and insert -- $idf_h^C$ --, therefor.

In column 10, line 51, delete "$CS_a^h$" and insert -- $CS_a^h$ --, therefor.

In column 10, line 55, delete "$CS_a^h$" and insert -- $CS_a^h$ --, therefor.

In column 10, line 61, delete "$S_{a,i}^h$" and insert -- $S_{a,i}^h$ --, therefor.

In column 10, line 63, delete "i -th" and insert -- i-th --, therefor.

In column 11, line 8, delete "$CS_a^h$" and insert -- $CS_a^h$ --, therefor.

In column 11, line 43, delete "$CS_a^h$" and insert -- $CS_a^h$ --, therefor.

In column 15, line 13, delete "accord" and insert -- accordance --, therefor.

In column 15, line 38, delete "$F_C^1$" and insert -- $F_C^1$ --, therefor.

In column 15, line 38, delete "$F_C^2$," and insert -- $F_C^2$, --, therefor.

In column 15, line 40, delete " $|\{h_i|S_i^1=s\}|$ " and insert -- $|\{h_i|S_i^1=s\}|$ --, therefor.

In column 15, line 45, delete " $|\{h_i|S_i^2=s\}|$ " and insert -- $|\{h_i|S_i^1=s\}|$ --, therefor.

In column 15, line 52, delete "h," and insert -- $h_i$ --, therefor.

In column 15, line 53, delete "$S_1^1$" and insert -- $S_i^1$ --, therefor.

In column 15, line 54, delete "$h_1$" and insert -- $h_i$ --, therefor.

In column 15, line 55, delete "$S_1^2$" and insert -- $S_i^2$ --, therefor.

In column 15, line 56, delete "$h_1$" and insert -- $h_i$ --, therefor.

In column 15, line 60, delete "$|\{h_1|S_1^1=s\}|$" and insert -- $|\{h_i|S_i^1=s\}|$ --, therefor.

In column 15, line 62, delete "$|\{h_1|S_1^2=s\}|$" and insert -- $|\{h_i|S_i^2=s\}|$ --, therefor.

CERTIFICATE OF CORRECTION (continued)
U.S. Pat. No. 7,062,498 B2

In column 16, line 17, delete "decision-maker" and insert -- decisionmaker --, therefor.

In column 16, line 24, delete "EMBODIMENTS" and insert -- APPLICATIONS --, therefor.

In column 16, line 46, delete "all right" and insert -- alright --, therefor.

In column 16, line 65, delete "evervhere's" and insert -- everywhere's --, therefor.

In column 17, line 19, delete "nor-normally" and insert -- nor normally --, therefor.

In column 17, line 20, delete "offhis" and insert -- ofhis --, therefor.

In column 17, line 26, delete "quitc" and insert -- quite --, therefor.

In column 17, lines 35–36, delete "thercin" and insert -- therein --, therefor.

In column 18, line 31, in Claim 3, delete "thresholds" and insert -- threshold --, therefor.

In column 18, line 33, in Claim 3, delete "threshold" and insert -- thresholds --, therefor.

In column 18, line 50, in Claim 7, delete "Tho" and insert -- The --, therefor.

Signed and Sealed this

Second Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,062,498 B2  Page 1 of 6
APPLICATION NO. : 10/027914
DATED : June 13, 2006
INVENTOR(S) : Al-Kofahi et al.

It is certified that error appears in the above-identified patent and that said Letters Patent is hereby corrected as shown below:

The title page showing the illustrative figure should be deleted to be replaced with the attached title page.

On the title page, item (56), under "Foreign Patent Documents", in column 2, line 1, after "11/2000" insert -- G06F 17/30 --.

On the title page, item (56), under "Other Publications", in column 2, line 1, delete "et al," and insert -- et al., --, therefor.

On the title page, item (74), "Attorney, Agent, or Firm", in column 2, line 1, delete "Lunberg," and insert -- Lundberg, --, therefor.

On page 2, item (56), under "Other Publications", in column 1, line 1, delete "et al," and insert -- et al., --, therefor.

On page 2, item (56), under "Other Publications", in column 1, line 4, delete "et al," and insert -- et al., --, therefor.

On page 2, item (56), under "Other Publications", in column 1, line 13, delete "Managment" and insert -- Management --, therefor.

On page 2, item (56), under "Other Publications", in column 2, line 28, delete "224–321." and insert -- 224–231. --, therefor.

The drawing sheet, consisting of Fig. 2, should be deleted to be replaced with the drawing sheet, consisting of Fig. 2, as shown on the attached page.

In the Drawings on Sheet 2 of 6, in Fig. 2 (Block – 232), line 1, delete "COMPUT=" and insert -- COMPUTE --, therefor.

In the Drawings on Sheet 2 of 6, in Fig. 2 (Block – 232), line 2, delete "BAS=D" and insert -- BASED --, therefor.

Signed and Sealed this

Twenty-seventh Day of April, 2010

David J. Kappos
*Director of the United States Patent and Trademark Office*

In column 2, line 35, after "computing and" delete "and".

In column 2, line 64, delete "320." and insert -- 320; --, therefor.

In column 2, line 67, delete "100." and insert -- 100; --, therefor.

In column 4, line 8, delete "Exemplary Headnote" and insert -- Exemplary Headnote: --, as a new heading on line 9.

In column 4, line 14, delete "supenor" and insert -- superior --, therefor.

In column 4, line 14, after "authority" insert -- . --.

In column 4, line 15, after "identifier" insert -- : --.

In column 6, line 23, delete "$V_a$" and insert -- $v_a$ --, therefor.

In column 6, line 25, delete "$v_a = tf_a^{1*} \, idf_a^1$," and insert -- $v_a = tf'_a * idf'_a$, --, therefor.

In column 6, line 26, delete "$tf_a^1$" and insert -- $tf'_a$ --, therefor.

In column 6, line 31, delete "$idf_a^1$" and insert -- $idf'_a$ --, therefor.

In column 6, line 32, delete "$idf_a^1$" and insert -- $idf'_a$ --, therefor.

In column 6, line 39, delete "$df_a^1$," and insert -- $df'_a$, --, therefor.

In column 7, line 49, delete ""-"" and insert -- "." --, therefor.

In column 7, line 50, delete "$V_a^1$" and insert -- $V'_a$ --, therefor.

In column 7, line 50, delete "$V_h^1$" and insert -- $V'_h$ --, therefor.

In column 7, line 54, delete "teems" and insert -- terms --, therefor.

In column 7, line 64, delete "$V_a^{C_n}$" and insert -- $V_a^C$ --, therefor.

In column 7, line 64, delete "$V_a^C$" and insert -- $V_a^C$ --, therefor.

In column 7, line 66, delete "$V_a^C$" and insert -- $v_a^C$ --, therefor.

In column 7, line 67, delete "$v_a^C = t f_a^C \cdot i d f_a^C,$" and insert -- $v_a^C = t f_a^C \cdot i d f_a^C,$ --, therefor.

In column 8, line 1, delete "$t f_a^C$" and insert -- $t f_a^C$ --, therefor.

In column 8, line 2, delete "$i d f_a^C$" and insert -- $i d f_a^C$ --, therefor.

In column 8, line 3, delete "$i d f_a^C$" and insert -- $i d f_a^C$ --, therefor.

In column 8, line 21, delete "$V_h^C$" and insert -- $v_h^C$ --, therefor.

In column 8, line 23, delete "$v_h^C$" and insert -- $v_h^C$ --, therefor.

In column 8, line 25, delete "$v_h^C = t f_h^C \cdot i d f_h^C,$" and insert -- $v_h^C = t f_h^C \cdot i d f_h^C,$ --, therefor.

In column 8, line 26, delete "$t f_h^C$" and insert -- $t f_h^C$ --, therefor.

In column 8, line 27, delete "$i d f_h^C$" and insert -- $i d f_h^C$ --, therefor.

In column 6, line 28, delete "$i d f_h^C$" and insert -- $i d f_h^C$ --, therefor.

In column 10, line 51, delete "$CS_a^h$" and insert -- $CS_a^h$ --, therefor.

In column 10, line 55, delete "$CS_a^h$" and insert -- $CS_a^h$ --, therefor.

In column 10, line 61, delete "$S_{a,l}^h$" and insert -- $S_{a,l}^h$ --, therefor.

In column 10, line 63, delete "i -th" and insert -- i-th --, therefor.

In column 11, line 8, delete "$CS_a^h$" and insert -- $CS_a^h$ --, therefor.

In column 11, line 43, delete "$CS_a^h$" and insert -- $CS_a^h$ --, therefor.

In column 15, line 13, delete "accord" and insert -- accordance --, therefor.

In column 15, line 38, delete "$Fc^1$" and insert -- $F_c^1$ --, therefor.

CERTIFICATE OF CORRECTION (continued)
U.S. Pat. No. 7,062,498 B2

In column 15, line 38, delete "$F_c^2,$" and insert -- $F_c^2,$ --, therefor.

In column 15, line 40, delete "$|\{b_t|S_t^1=s\}|$" and insert -- $|\{h_i|S_i^1=s\}|$ --, therefor.

In column 15, line 45, delete "$|\{b_t|S_t^2=s\}|$" and insert -- $|\{h_i|S_i^2=s\}|$ --, therefor.

In column 15, line 52, delete "h," and insert -- $h_i$ --, therefor.

In column 15, line 53, delete "$S_1^1$" and insert -- $S_i^1$ --, therefor.

In column 15, line 54, delete "$h_1$" and insert -- $h_i$ --, therefor.

In column 15, line 55, delete "$S_1^2$" and insert -- $S_i^2$ --, therefor.

In column 15, line 56, delete "$h_1$" and insert -- $h_i$ --, therefor.

In column 15, line 60, delete "$|\{h_1|S_1^1=s\}|$" and insert -- $|\{h_i|S_i^1=s\}|$ --, therefor.

In column 15, line 62, delete "$|\{h_1|S_1^2=s\}|$" and insert -- $|\{h_i|S_i^2=s\}|$ --, therefor.

In column 16, line 17, delete "decision-maker" and insert -- decisionmaker --, therefor.

In column 16, line 24, delete "EMBODIMENTS" and insert -- APPLICATIONS --, therefor.

In column 16, line 46, delete "all right" and insert -- alright --, therefor.

In column 16, line 65, delete "evervhere's" and insert -- everywhere's --, therefor.

In column 17, line 19, delete "nor-normally" and insert -- nor normally --, therefor.

In column 17, line 20, delete "offhis" and insert -- ofhis --, therefor.

In column 17, line 26, delete "quitc" and insert -- quite --, therefor.

In column 17, lines 35–36, delete "thercin" and insert -- therein --, therefor.

In column 18, line 31, in Claim 3, delete "thresholds" and insert -- threshold --, therefor.

In column 18, line 33, in Claim 3, delete "threshold" and insert -- thresholds --, therefor.

In column 18, line 50, in Claim 7, delete "Tho" and insert -- The --, therefor.

(12) United States Patent
Al-Kofahi et al.

(10) Patent No.: US 7,062,498 B2
(45) Date of Patent: Jun. 13, 2006

(54) SYSTEMS, METHODS, AND SOFTWARE FOR CLASSIFYING TEXT FROM JUDICIAL OPINIONS AND OTHER DOCUMENTS

(75) Inventors: Khalid Al-Kofahi, Webster, NY (US); Peter Jackson, Burnsville, MN (US); Timothy Earl Travers, Rochester, NY (US); Alex Tyrell, Canandaigua, NY (US)

(73) Assignee: Thomson Legal Regulatory Global AG, Thalwel (CH)

( * ) Notice: Subject to any disclaimer, the term of this patent is extended or adjusted under 35 U.S.C. 154(b) by 401 days.

(21) Appl. No.: 10/027,914

(22) Filed: Dec. 21, 2001

(65) Prior Publication Data
US 2003/0101181 A1 May 29, 2003

Related U.S. Application Data
(60) Provisional application No. 60/336,862, filed on Nov. 2, 2001.

(51) Int. Cl.
G06F 17/00 (2006.01)

(52) U.S. Cl. .................... 707/101; 715/530
(58) Field of Classification Search ............... 707/100, 707/101; 715/530, 531
See application file for complete search history.

(56) References Cited

U.S. PATENT DOCUMENTS

| | | | | |
|---|---|---|---|---|
| 4,961,152 A | * | 10/1990 | Davis | 706/13 |
| 5,054,093 A | * | 10/1991 | Cooper et al. | 382/159 |
| 5,157,783 A | | 10/1992 | Anderson et al. | 395/600 |
| 5,265,065 A | | 11/1993 | Turtle | 395/600 |
| 5,383,120 A | * | 1/1995 | Zernik | 704/10 |
| 5,418,948 A | | 5/1995 | Turtle | 395/600 |
| 5,434,932 A | | 7/1995 | Scott | 382/309 |
| 5,438,629 A | * | 8/1995 | Moed et al. | 382/156 |
| 5,488,725 A | | 1/1996 | Turtle et al. | 395/600 |
| 5,497,317 A | | 3/1996 | Hawkins et al. | 364/408 |
| 5,644,720 A | | 7/1997 | Boll et al. | 395/200.12 |
| 5,761,383 A | * | 6/1998 | Engel et al. | 706/14 |
| 5,778,397 A | * | 7/1998 | Kupiec et al. | 715/500 |
| 5,918,240 A | * | 6/1999 | Kupiec et al. | 715/531 |
| 5,991,755 A | | 11/1999 | Noguchi et al. | 707/3 |

(Continued)

FOREIGN PATENT DOCUMENTS

WO WO-00/67162 11/2000

OTHER PUBLICATIONS

Conrad et al, "A Cognitive Approach to Judicial Opinion Structure: Applying Domain Expertise to Component Analysis", ACM, May 2001, pp. 1–11.*

(Continued)

*Primary Examiner*—Uyen Le
(74) *Attorney, Agent, or Firm*—Schwegman, Lunberg, Woessner & Kluth, P.A.

(57) ABSTRACT

To reduce cost and improve accuracy, the inventors devised systems, methods, and software to aid classification of text, such as headnotes and other documents, to target classes in a target classification system. For example, one system computes composite scores based on: similarity of input text to text assigned to each of the target classes; similarity of non-target classes assigned to the input text and target classes; probability of a target class given a set of one or more non-target classes assigned to the input text; and/or probability of the input text given text assigned to the target classes. The exemplary system then evaluates the composite scores using class-specific decision criteria, such as thresholds, ultimately assigning or recommending assignment of the input text to one or more of the target classes. The exemplary system is particularly suitable for classification systems having thousands of classes.

17 Claims, 6 Drawing Sheets